United States Patent [19]
Bechtel

[11] 4,066,867

[45] Jan. 3, 1978

[54] TEMPERATURE CONTROL CIRCUIT WITH TWO INDEPENDENT SWITCH OUTPUTS

[75] Inventor: Jon H. Bechtel, Wayne, Pa.

[73] Assignee: Robertshaw Controls Company, Richmond, Va.

[21] Appl. No.: 733,973

[22] Filed: Oct. 19, 1976

[51] Int. Cl.² .............................................. H05B 1/02
[52] U.S. Cl. .................................. 219/483; 219/497; 219/501
[58] Field of Search ....................... 307/117, 127, 133; 219/490, 483, 486, 484, 497, 499, 501

[56] References Cited

U.S. PATENT DOCUMENTS

3,854,033  12/1974  Edge .................... 219/483

*Primary Examiner*—C. L. Albritton
*Assistant Examiner*—Fred E. Bell
*Attorney, Agent, or Firm*—Harold W. Adams; Auzville Jackson, Jr.

[57] ABSTRACT

The invention is a temperature control circuit which time shares a temperature sensor and related circuit elements in order to switch two control signal outputs, each output at one of two preselected temperatures. In a preferred embodiment, the invention is used to control a self-cleaning oven.

16 Claims, 9 Drawing Figures

TEMPERATURE CONTROL CIRCUIT WITH TWO INDEPENDENT SWITCH OUTPUTS

BACKGROUND OF THE INVENTION

It is frequently desirable to couple two output devices to temperature sensors in such a way that each output has its own selective temperature setpoint. Each output then switches state when its associated setpoint is reached. Examples of such circuit arrangements may be found in self-cleaning oven controls wherein it is required to prevent the oven door from being opened when the temperature exceeds a determined level, for instance 575° F, while simultaneously controlling the oven heating elements to maintain a cleaning temperature of up to 900° F.

Another example of an application of this invention is in the control of a blower in a domestic forced hot air heating system which is to be turned on when the supply plenum temperature reaches about 130° F. Typically, a high limit safety is provided to shut off the furnance when the temperature exceeds, for instance 180° F.

In both of the above two examples it is desirable to design the circuit so that the failure mode will be safe for as many circuit component malfunctions as possible. It may also be desirable to operate the device directly in a 240 volt, three wire circuit without the use of a step-down transformer.

SUMMARY OF THE INVENTION

These and many other objects are achieved by the invention which includes a temperature control that time shares a temperature sensor and related circuit elements to switch two separate outputs each at one of two preselected temperatures. In a preferred embodiment, the invention is used to control a self-cleaning oven.

An additional advantage of a temperature control circuit in accordance with the invention is the minimization of the number of circuit failures which can cause unwanted outputs and thus malfunction.

BRIEF DESCRIPTION OF THE INVENTION

Figure 1:
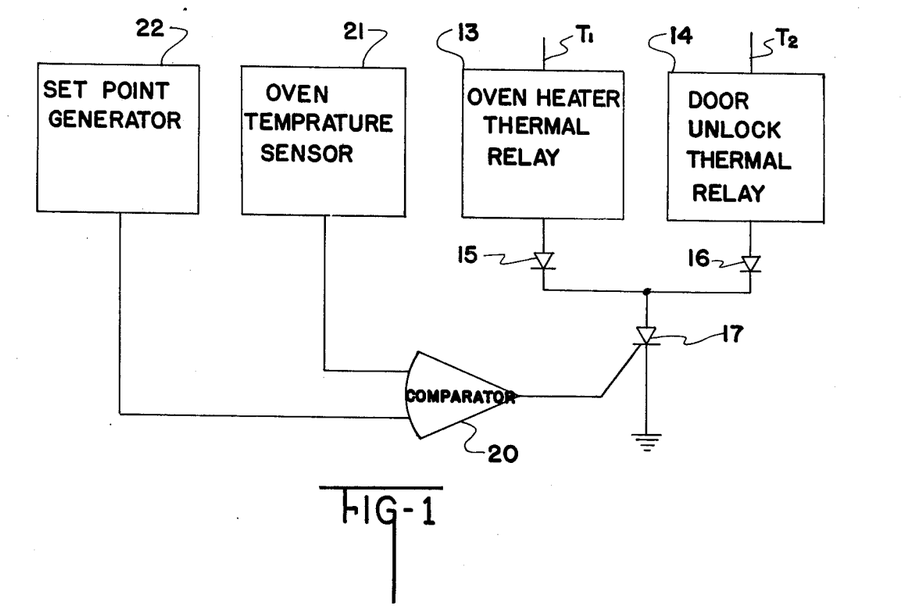
FIG. 1 is a simplified block schematic of a preferred embodiment of the invention when used as a temperature control circuit in a self-cleaning oven.
Figure 2:
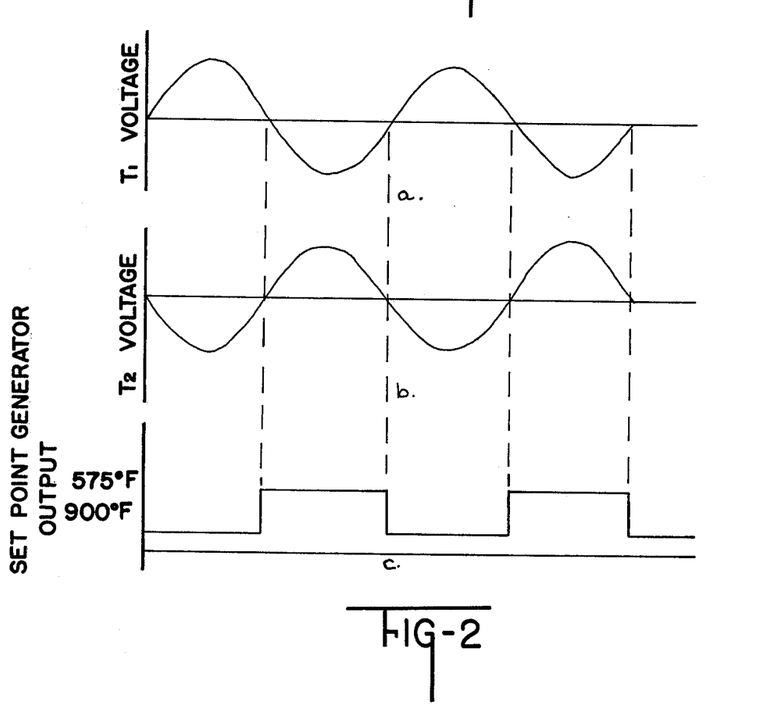
FIG. 2 illustrates voltage wave forms related to the operation of the schematic shown in FIG. 1.
Figures 3, 4:
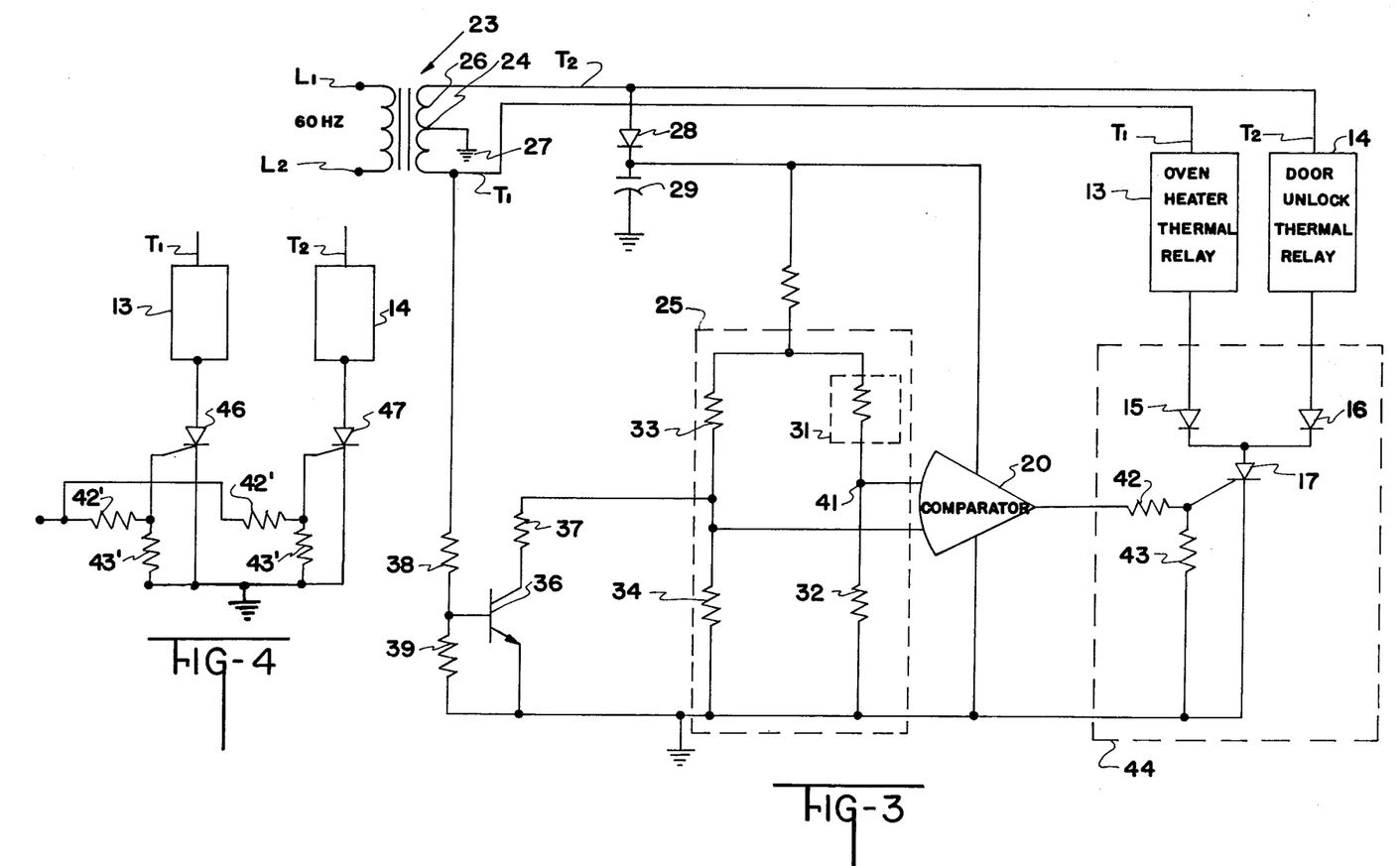
FIG. 3 is a detailed electrical schematic of the invention shown in FIG. 1 illustrating both the setpoint generator and oven temperature sensor.
FIG. 4 is an electrical schematic of an alternative gating means for use in the electrical circuit of FIG. 3.

Referring to the drawings FIGS. 1, 2 and 3 illustrate a preferred embodiment of the invention in a temperature control circuit for a self-cleaning oven.

FIG. 1 is a simplified block diagram, FIG. 2 illustrates related voltage wave forms of the circuit and FIG. 3 is an electrical schematic showing the invention in greater detail. While the invention may be used in other applications, to simplify the description here all the embodiments of the invention will be described as applied to the control of a self-cleaning oven in the clean mode.

It is to be understood that the circuit shown in FIG. 3 is normally included with appropriate temperature setpoint adjustments to control the oven temperature in the bake, broil and keep warm mode of operation as well as the clean mode. However, these features will not be described here because they are not believed necessary for understanding the invention.

Referring again to FIGS. 1, and 2, the input heater of a relay 13 which energizes the oven heaters (either gas or electric and not shown) is energized by voltage wave Form $T_1$ shown in FIG. 2a. The input heater of thermal relay 14 which energizes the oven door unlock circuit (not shown) is energized by voltage wave Form $T_2$ shown in FIG. 2b. As shown voltage $T_2$ is 180° out of phase with $T_1$. Diodes 15 and 16 are provided to block series conduction of current from $T_1$ to $T_2$ through the heaters of the thermal relays 13 and 14. Thus, power can be supplied to the thermal relay 13 which energizes the oven heating elements only during the half cycle when voltage $T_1$ is positive because the diode 15 blocks conduction when voltage $T_1$ is negative. Similarly, conduction to the thermal relay 14 which energizes the door unlock circuit occurs only during the half cycle when voltage $T_1$ is positive. Conduction during the positive half cycle of either voltage $T_1$ or $T_2$ can occur only when SCR 17 has been triggered by a positive output from comparator 20. The circuit is arranged so that the output of comparator 20 is positive when the output from temperature sensor 21 is positive with respect to the output from a temperature setpoint generator 22. For the cleaning mode of operation the circuit is arranged so that SCR 17 is triggered only when the oven temperature is below oven cleaning setpoint temperature, typically 900° F.

The setpoint temperature generator 22 is arranged to provide an output representative of 900° F during the positive half cycle of voltage $T_1$, thus energizing oven heater relay 13 assuming the oven temperature is less than 900° F. Similarily during the positive half cycle of voltage $T_2$ and which is 180° out of phase with $T_1$, the temperature setpoint generator 22 provides an output representative of 575° F to energize the door unlock relay 14 and unlock the door when the oven temperature is below the 575° F setpoint. Thus, the output of the setpoint generator 22 is 900° during the positive half cycle of $T_1$ when the oven heater relay 13 can be energized and 575° F during the positive half cycle of $T_2$ when the door unlock relay 14 can be energized. Thus, the required 900° F switch point is maintaned for the oven heater control and the 575° switch point is maintained for the door unlock control.

Refer now to FIG. 3, an electrical schematic which operates according to the principles illustrated in FIG. 1 and as described above. A center tapped transformer 23 is energized from AC power lines L1 and L2 and the output center tap 24 secondary 26 is chosen as circuit ground 27 so that $T_1$ and $T_2$ are 180° out of phase from opposite sides of the transformer center tap 24. Diode 28 and capacitor 29 provide a DC supply for the comparator 20 and also for temperature sensing bridge cicruit 25 formed by a temperature sensor 31 and resistors 32, 33 and 34 which is normally in balance at 575° F.

When transistor 36 conducts an impedance, resistor 37, is switched into a parallel connection with resistance 34 so that the balance point of the bridge is the 900° F. Resistors 38 and 39 form a voltage divider which supplies current to the base of transistor 36 turning it on during the positive half cycle of voltage $T_1$. Thus, the bridge balance point is 900° during the positive half cycle of voltage $T_1$ and switches to 575° F during the positive half cycle of $T_2$.

The resistance of the temperature sensor 31 increases with increasing temperature so that the voltage at point 41 decreases with increasing temperature. Thus, the output of comparator 20 is low when the oven temperature exceeds the setpoint of 900° F and high when the oven temperature is below the same setpoint.

In practice, a commercially available operational amplifier may be used as the comparator 20—for instance, the CA3094T programmable power switch/amplifier of RCA, Somerville, N.J. As is well known the circuit is arranged so that when the output of the comparator 20 is high current is supplied to the gate of SCR 17 through the voltage divider formed by resistors 42 and 43. When SCR 17 conducts current is allowed to flow through the input heater of the oven heater relay 13 during the positive half cycle of voltage $T_1$ and through the door unlock relay 15 during a positive half cycle of $T_2$.

This results in the desired switching action where the oven heater relay 13 is energized for temperature below 900° F and the door unlock is energized for temperatures below 575° F. Diodes 15 and 16 prevent series conduction of current from $T_1$ to $T_2$ through the input heaters of relays 13 and 14.

FIG. 4 represents an alternative circuit for the portion of the circuit of FIG. 3 shown in the dotted enclosure designated by the reference numeral 44. In this circuit separate SCRs 46 and 47 are used to gate current through the thermal relays 13 and 14 respectively. Thus, diodes 15 and 16 are not required as shown in FIG. 3. The circuit operation is similar since the SCR 46 can conduct only when $T_1$ is positive and SCR 47 can conduct only when $T_2$ is positive. This alternate circuit is particularly advantageous for control of inductive loads for example where magnetic relays are used in place of the thermal relays and where the lagging phase of the current could cause the circuit of FIG. 3 to latch into conduction during a half cycle when a trigger pulse is supplied during the preceeding half cycle.

ALTERNATIVE EMBODIMENT A

Figure 5:
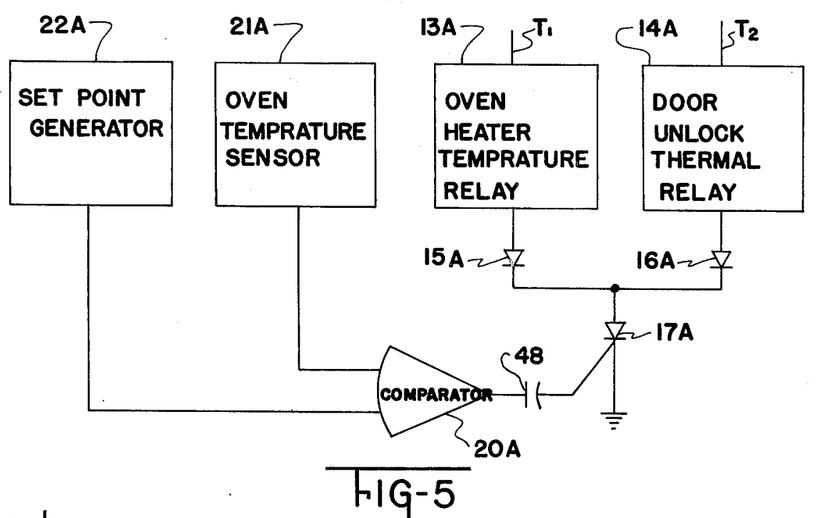
FIG. 5 is a simplified block schematic of an alternative embodiment of the invention shown in FIG. 1 that precludes certain outputs in the presence of a number of different circuit malfunctions including a shorted oven temperature sensor.
Figure 6:
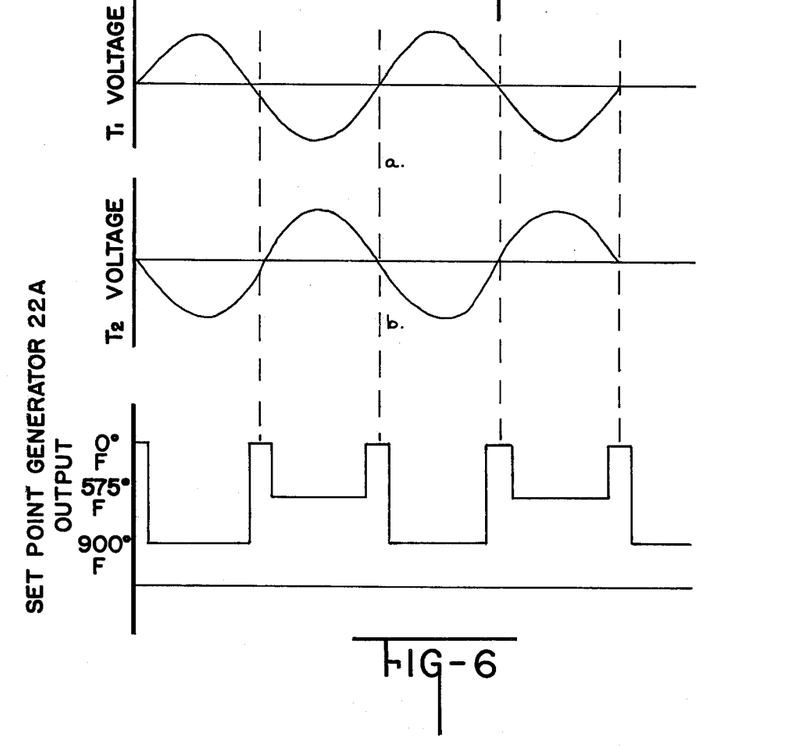
FIG. 6 illustrates various voltage wave forms present in the circuit of FIG. 5.
Figure 7:
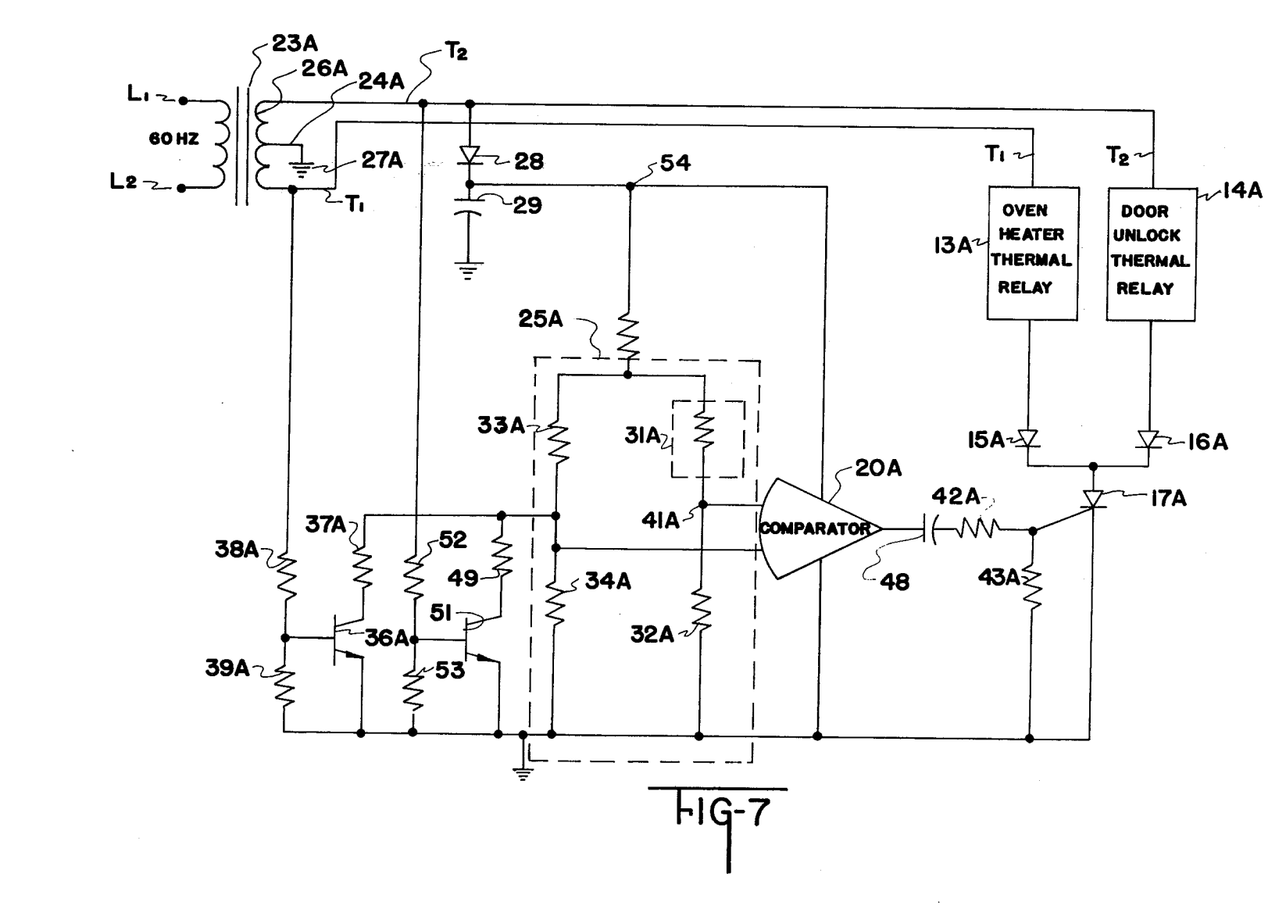
FIG. 7 is more detailed electrical schematic of the invention shown in FIG. 5 including a setpoint generator and the oven temperature sensor.

FIGS. 5, 6 and 7 illustrate an alternative embodiment of the invention similar to that shown in FIGS. 1, 2 and 3 modified so that the circuit output will not occur in the presence of a number of certain malfunctions including a shorted oven temperature sensing resistor 31A. The operation of the invention shown in FIGS. 5, 6 and 7 is similar to that described above and the distinctions between the two inventions can best be understood by comparing FIGURES.

As shown in FIG. 5 a capacitor 48 has been inserted between the comparator 20A and SCR 17A so that a positive going transistion at the output of comparator 20A is required to trigger SCR 17A. The setpoint generator 22A has been modified so that its output corresponds to 0° F in all neighborhoods of the transistions in polarity of $T_1$ and $T_2$.

0° F is chosen because it is below any temperature for which the oven should be called upon to operate. Take as an example an oven temperature of 700° and a setpoint generator output of 0° F, the output of the comparator 20A is low. Now when the setpoint generator 22A switches to 900° F the output of comparator 20A will switch high with the resulting triggering of SCR 17A. If the oven temperature had been above 900° F in the above example the output of the comparator 20A would remain low and no trigger pulse would be created. If the oven temperature sensing resistor 31A is shorted the indicated oven temperature would be below 0° F and the output of the comparator 20A would remain high so that no trigger pulse is created.

Other circuit malfunctions which cause a steady comparator output will also inhibit triggering of the SCR. The operation is substantially the same when the setpoint generator output switches from 0° to 575°. As shown the technique by which the 900° F and 575° F setpoints control the oven heater relay 13A and door unlock relay 14A respsectively is the same as in FIG. 3.

FIG. 7 is a detailed schematic of the alternative embodiment illustrated in FIG. 5 which operates according to the same principles. Since there are few distinctions between this circuit and the one shown in FIG. 3 only the differences will be explained.

As shown in FIG. 7, capacitor 48 couples positive going transistions of the comparator 20A to the gate of SCR 17A through a voltage divider formed by resistors 42A and 43A so that the SCR 17A is triggered only on positive going transistions of comparator 20A. The value of resistor 34A is selected so that the balance point of the bridge 25A formed by temperature sensing resistor 31A and resistors 32A, 33A and 34A is 0° F.

Resistor 37A is selected so that when it is placed in parallel with resistor 34A the balance point of the bridge becomes 900° F. Resistor 49 is selected so that when it is placed in parallel with resistor 34A the balance point of the bridge becomes 575°. Transistor 51 is turned on by current from the voltage divider formed by the resistors 52 and 53 during the positive half cycle of $T_2$.

Resistance 49 is switched in parallel with resistance 34A when transistor 51 conducts and the resulting bridge balance point is 575° F. Transistor 36A conducts when the voltage at $T_1$ is greater than plus four volts and transistor 51 conducts when the voltage at $T_2$ is greater than plus 4 volts. Thus, the bridge balance point is 0° F in the neighborhood of the polarity transistions of $T_1$ and $T_2$ as required. The remainder of the circuit operation is the same as that of the invention shown in FIG. 4.

It has been discovered that the voltage at Point 54 may be negative with respect to ground, the connections of resistors 38A and 52 to $T_1$ and $T_2$ reversed, transistors 36A and 51 changed to PNP types and input and supply connections to comparator 20A reversed and the circuit will still function as before. However, since all of the comparator amplifier potentials are now negative with respect to the cathode of SCR 17A, a short in the capacitor 48 will not trigger the output SCR.

ALTERNATIVE EMBODIMENT B

Figure 8:
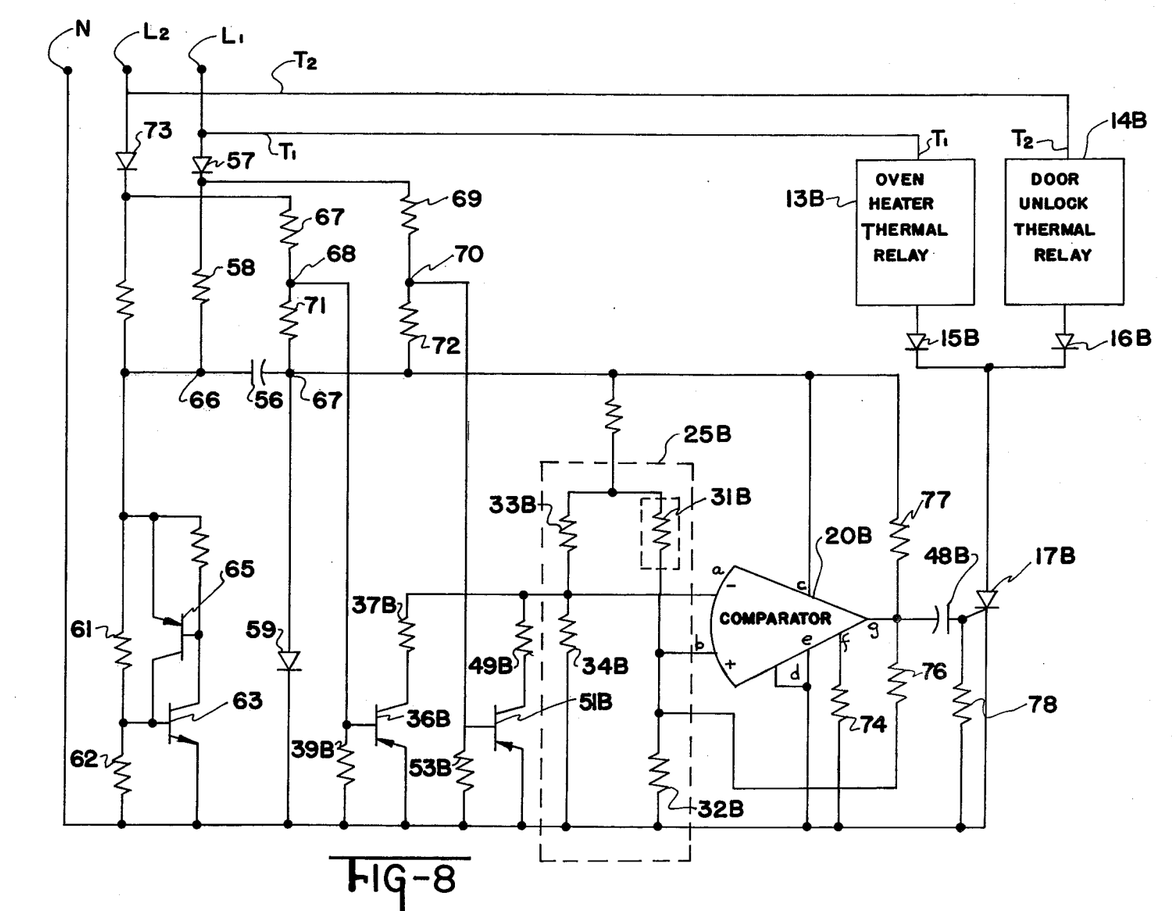
FIG. 8 is a second alternate embodiment in which no transformer is used.

As illustrated in FIG. 8, (alternative embodiment B) the invention can be employed to operate directly from a 220 volt DC line having hot leads L1 and L2 and a center tapped neutral N. In this circuit the temperature sensing bridge, the comparator output section, and the logic for pairing setpoint generation with related outputs are analagous to those in the circuit of FIG. 7. Therefore, corresponding numbers with the suffix B have been given to components which perform analogous functions in the two circuits.

As shown the method of supplying power to the circuit is different and although the capacitor coupling of the comparator 20B to the output SCR 17B is the same as well as the fail safe protection for circuit malfunctions, the sequence of events required to trigger the SCR 17B is somewhat different. Here a capacitor 56 is charged through diode 57 and resistor 58 during the positive half cycle of L1. The charging current flows from capacitor 56 to the neutral N through diode 59. Approximately half way through each half cycle the charge on capacitor 56 reaches, as an example about 15 volts at which point the voltage across the voltage divider formed by resistors 61 and 62 becomes great enough to provide current to the base of transistor 63.

Transistor 63 then turns on, in turn turning on transistor 65 which supplies additional base drive to transistor 63. Transistors 63 and 65 both latch in conduction for the remainder of the half cycle and point 66 is pulled to within about 1 volt to the neutral N. A negative going pulse of about 13 volts is supplied by capacitor 56 at point 67. This pulse powers the temperature sensing bridge 25B and the comparator 20B.

As in the previous circuit, the bridge formed by temperature sensing resistor 31B and resistors 32B, 33B and 34B, balances at 0° F. Placing resistance 37B in parallel with resistor 34B raises the bridge balance point to 900° F and placing resistance 49B in parallel with resistance 34B raises the bridge balance point to 575° F.

Resistor 67 holds point 68 high and prevents turn on of transistor 36B during the positive half cycle of L2. Likewise resistor 69 prevents turn of transistor 51B during the positive half cycle of L1. Resistors 67 and 69 are high in value relative to resistors 71, 39B, 72 and 53B.

For instance, during the negative cycle of L2 when diode 73 is not conducting and the voltage across resistor 67 is small, resistance 67 has little affect on the voltage at point 68. Likewise during the negative half cycle of L1, resistor 69 has little affect on the voltage at point 70. During the positive half cycle of L1 (when L2 is negative), resistors 71 and 39B form a voltage divider which supplies current to the base of transistor 36B turning it on when the voltage of the pulse at point 67 is less than say $-8$ volts.

Figure 9:
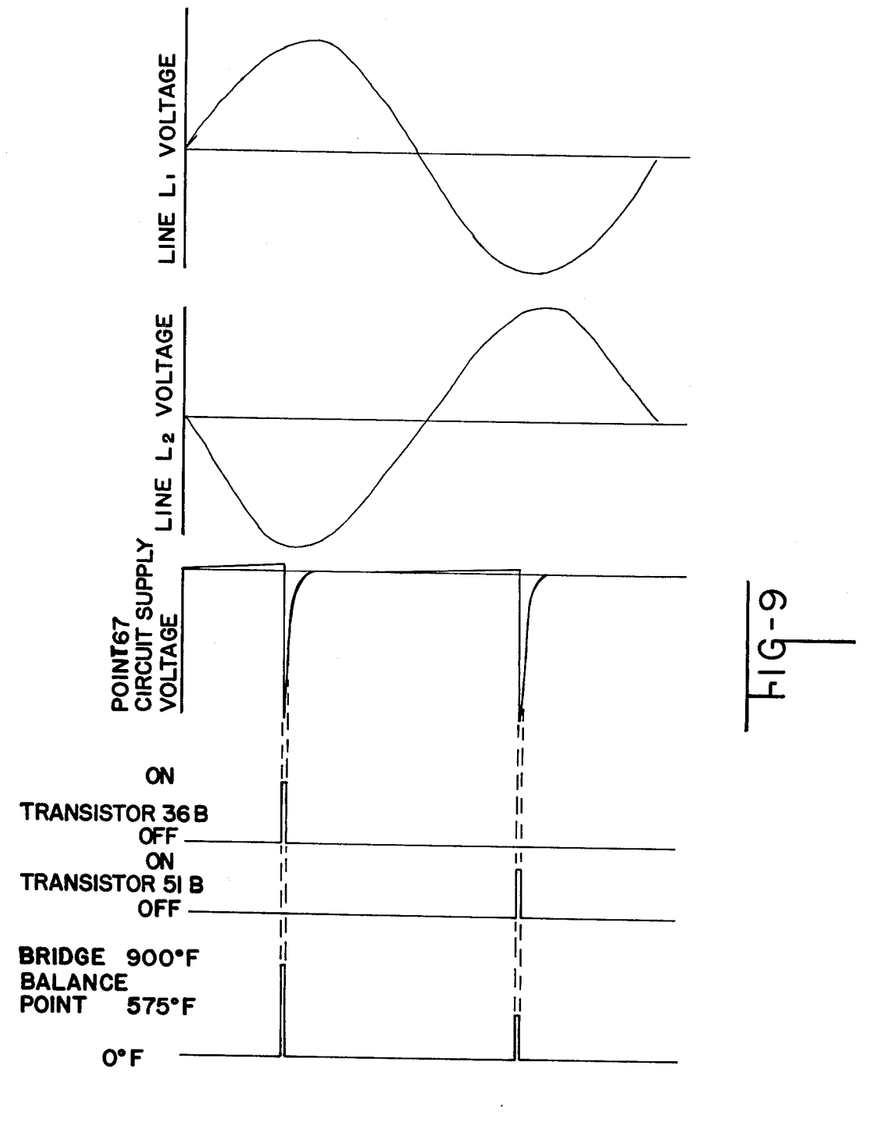
FIG. 9 illustrates voltage wave forms in the circuit FIG. 8.

Likewise, during a positive half cycle of L2, transistor 51B turns on when the voltage of the pulse at point 67 is less than say $-8$ volts. The wave forms of FIG. 8 as shown in FIG. 9 indicate the relative polarities of L1 and L2, the wave form of the supply pulse at point 67, the points at which transistors 36B and 51B conduct and the temperatures at which the temperature sensing resistance bridge is in balance.

As mentioned, the comparator 20B used in this circuit may be a CA3049T programmable power switch - amplifier. It has an inverting differential input pin (a), a non-inverting differential input pin (b) a negative supply pin (c), a positive power supply pin (d), an output pin (e), programmable current input pin (f) and an output pin (g). Resistor 74 establishes a bias current level in the device while resistor 76 creates a positive feedback to cause rapid switching of the output at Pin (g). The resistor 77 provides a charging path for the capacitor 48B when the output of the comparator 20B at pin (g) is off.

As an example of the operation of the invention shown in FIG. 8, assume the oven temperature is 700° F. During the half cycle when L1 is positive and during the most negative portion of the supply pulse, the bridge balance point is 900° F. The resistance of sensor 31B is lower than its 900° F resistance and the voltage at pin (b) is therefore more negative than the voltage at pin (a). The output of comparator of 20B is off, and capacitator 48B is then charged by current flowing from neutral N through resistor 78, capacitor 48B, and resistor 77 to the negative pulsed supply point 67. When the negative pulse height decays to $-8$ volts transistor 36B turns off and the bridge balance point returns to 0° F, the voltage at pin (a) being more negative than the voltage at pin (b). The output of comparator 20B then switches rapidly to its high state transferring the charge stored on capacitor 48B to the gate of SCR 17B. SCR 17B then conducts allowing current to flow from L1 through the oven heater relay 13B and diode 15B. During the alternate half cycle when L2 is positive, the bridge balance point switches from 0° F to 575° F, the output of comparator 20B remains high, and SCR 17B is not triggered. The door unlock relay 14B remains unenergized.

If temperature sensing resistor 31B shorts, pin (b) remains negative with respect to pin (a) and capacitor 48B charges and then discharges as the pulse at 67 decays. This discharge is too slow to supply the required positive voltage to fire SCR 17B and the output is not triggered.

While the last described embodiment does not incorporate a differential in the switch points, this feature may be added using resistive and capacitive elements at the comparator 20B or by introducing positive feedback from the thermal relay outputs.

Although the preferred and alternative embodiments of the invention have been described in detail, the principles of the invention are to be limited only by the scope of the appended claims.

What is claimed is:

1. An electrical temperature control circuit energized from an alternating current voltage supply comprising:
    means for sensing temperature and generating a temperature signal representative thereof;
    means including and for time sharing said temperature sensing means by alternately generating separate setpoint temperature signals representative of two preselected setpoint temperatures during alternate and opposite phases of said alternating current supply voltage;
    comparator means for alternately comparing said temperature signal with each of said setpoint temperature signals during alternate and opposite phases of said alternating current supply voltage and generating an output control signal based on said comparison;
    two control means; and
    switching means responsive to said output control signal of said comparator means for alternately and selectively energizing said control means from said alternating current voltage supply.

2. A temperature control circuit as defined in claim 1 wherein said temperature sensing means comprising a bridge network including a temperature responsive resistance means.

3. A temperature control circuit as defined in claim 2 wherein said time sharing means comprises:
an impedance means; and
switching means responsive to like phases of said alternating current supply voltage for connecting said impedance means into said bridge network thereby selectively and alternately changing the balance point and thus the temperature setpoint of said bridge network during opposite phases of said alternating current supply voltage.

4. A temperature control circuit as defined in claim 3 wherein said impedance means comprises a resistor and said switching means comprises transistor means for connecting said resistor in parallel with one leg of said bridge network.

5. A temperature control circuit as defined in claim 1 wherein said comparator means comprises an operational amplifier arranged to compare said temperature signal and said respective setpoint temperature signals and provide a positive output control signal only when the difference between the said sensed temperature signal and the respective setpoint temperature signal is of a predetermined sign.

6. A temperature control circuit as defined in claim 5 wherein said switching means comprises an SCR, said output control signal of said comparator means being connected to the gate of said SCR, said circuit being arranged to switch and render said SCR conductive upon a positive output control signal.

7. A temperature control circuit as defined in claim 6 wherein said two control means comprise thermal relay means series connected to said alternating current voltage supply.

8. A temperature control circuit as defined in claim 7 including current blocking means permitting current conduction in each of said respective relay means only during like but opposite phases of said alternating current supply voltage and through said switching means.

9. A temperature control circuit as defined in claim 8 wherein said current blocking means comprises oppositely poled diodes series connected between said relay means, said SCR being connected between said diodes.

10. A temperature control circuit as defined in claim 1 wherein said switching means comprises an SCR connected to each of said control means, both of said SCRs being responsive to said output control signal to selectively energize said control means from said alternating current voltage supply.

11. In a self-cleaning oven having a heating element for supplying heat during both baking and cleaning and an oven door locking mechanism normally locked only during cleaning, a temperature control circuit as defined in claim 7 wherein one of said thermal relays controls said heating element and the other thermal relay controls said door locking mechanism.

12. The invention as defined in claim 11 wherein said temperature setpoint signals represent the maximum cleaning and baking temperatures of said oven.

13. A temperature control circuit as defined in claim 2 wherein said bridge network including said temperature responsive resistance is balanced at a third low temperature point representative of a temperature value below the lowest value of temperature to be sensed by said temperature responsive resistance means;
and said time sharing means comprises two impedances and switching means responsive to opposite phases of said alternating current supply voltage for alternately connecting one of said respective two impedances into said bridge network thereby selectively and alternately changing the bridge network balance point and thus the temperature setpoint between a first and second setpoint value, a period being allowed between each setpoint signal during which time, neither impedance is switched in bridge so that the bridge balances at its third low temperature balance point, both of said temperature setpoint values being within the range of temperatures to be sensed by said temperature responsive resistance means, said circuit being arranged to apply a positive going output control signal to said switching means only when said temperature signal is greater than said third temperature balance point and less than a selected one of first and second setpoint values.

14. A temperature control circuit as defined in claim 13 including capacitor means interconnecting said comparator means and said switching means wherein said switching means is rendered conductive only on positive going transitions of said output control signal.

15. A temperature control circuit as defined in claim 14 wherein said alternating current voltage supply is from the secondary winding of a stepdown transformer energized by an alternating current line voltage.

16. A temperature control circuit as defined in claim 15 wherein said control means are directly energized by said switching means from an alternating current line voltage.

* * * * *